United States Patent
Mori et al.

(10) Patent No.: US 7,149,548 B2
(45) Date of Patent: Dec. 12, 2006

(54) ANTENNA APPARATUS FOR BASE STATION AND METHOD OF OPTIMIZING TRAFFIC CAPACITY IN CDMA COMMUNICATIONS SYSTEM

(75) Inventors: Shinichi Mori, Yokosuka (JP); Tetsuro Imai, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 398 days.

(21) Appl. No.: 10/365,486

(22) Filed: Feb. 13, 2003

(65) Prior Publication Data
US 2003/0153361 A1    Aug. 14, 2003

(30) Foreign Application Priority Data
Feb. 14, 2002    (JP)    ............................. 2002-037296

(51) Int. Cl.
*H04M 1/00*    (2006.01)
(52) U.S. Cl. .................... 455/562.1; 455/63.4; 455/25; 455/450
(58) Field of Classification Search ............. 455/562.1, 455/447, 450–453, 63.4, 25
See application file for complete search history.

(56) References Cited

U.S. PATENT DOCUMENTS

| | | | |
|---|---|---|---|
| 6,728,554 B1 * | 4/2004 | Wegner | 455/562.1 |
| 6,771,988 B1 * | 8/2004 | Matsuoka et al. | 455/562.1 |
| 6,836,674 B1 * | 12/2004 | Taniguchi et al. | 455/562.1 |
| 2001/0044276 A1 * | 11/2001 | Ihara et al. | 455/63 |

FOREIGN PATENT DOCUMENTS

| | | | |
|---|---|---|---|
| JP | 63-16707 | | 2/1988 |
| JP | 5-53314 | | 7/1993 |
| JP | 8-8631 | | 1/1996 |
| JP | 9-74310 | | 3/1997 |
| JP | 10-126139 | | 5/1998 |
| JP | 2000-261244 | * | 5/1999 |
| JP | 2000-261244 | | 9/2000 |
| JP | 2001-203623 | | 7/2001 |
| JP | 2001-203629 | | 7/2001 |
| WO | WO 95/22210 | | 8/1995 |
| WO | WO 01/01582 | | 1/2001 |
| WO | WO 01/15477 | | 3/2001 |
| WO | WO 01/84869 | | 11/2001 |

* cited by examiner

*Primary Examiner*—Joseph Feild
*Assistant Examiner*—Dung Lam
(74) *Attorney, Agent, or Firm*—Oblon, Spivak, McClelland, Maier & Neustadt, P.C.

(57) ABSTRACT

An antenna apparatus is installed in a base station in a code division multiple access communication system. The antenna apparatus comprises a plurality of antenna elements, each receiving a radio signal; a controller that produces an antenna control signal based on information contained in the radio signal received at each of the antenna elements; an adjusting unit that adjusts directivity characteristics of each of the antenna elements based on the antenna control signal; and an allocating unit that allocates the antenna elements to sectors based on the antenna control signal. The sector covers a portion of a cell controlled by the base station, and the number of sectors in the cell is variable by means of the antenna control signal.

18 Claims, 11 Drawing Sheets

FIG.8A
FIG.8B
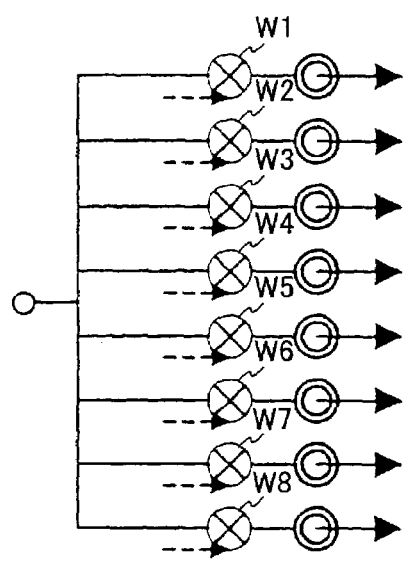
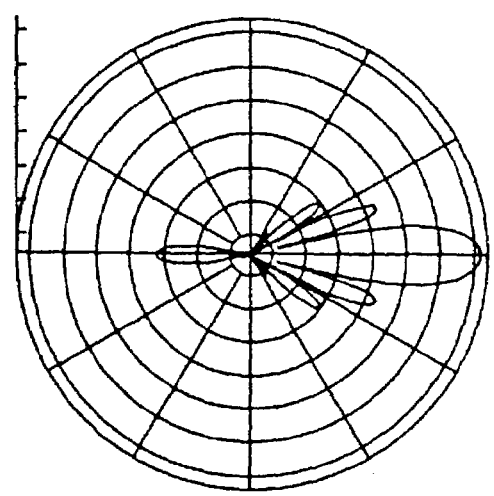
◎ BEAM ANTENNA

6-SECTOR ANTENNA ARRAY (S=6, A=3)

ANTENNA APPARATUS FOR BASE STATION AND METHOD OF OPTIMIZING TRAFFIC CAPACITY IN CDMA COMMUNICATIONS SYSTEM

BACKGROUND OF THE INVENTION

1. Field of the Invention

The invention generally relates to a technique of Code Division Multiple Access (CDMA), and more particularly, to a base-station antenna apparatus and a method of optimizing traffic capacity of the cell in a CDMA communications system.

2. Description of the Related Art

In the CDMA communication system, multiple channels independently occupy the same frequency band, and all signals are transmitted simultaneously in time. The different channels (or waveforms) in CDMA are distinguished from one another at the receiver using the specific spreading codes they employ. In CDMA, all the signals other than the target channel become interference signals. Since an excessive amount of interference prevents good communication conditions, the number of permissible users (i.e., the traffic capacity) in the cell or the sector is inevitably limited. To this end, an appropriate measure for reducing interference is required in order to increase the traffic capacity as much as possible.

One known technique for reducing interference from other communication channels is cell sectoring. With this technique, the cell under the control of the base station is divided into multiple sectors, and the base station is furnished with multiple directional antennas with different beam patterns, each antenna corresponding to one of the sectors. The main beam of each directional antenna is turned to the associated sector, while the side lobe is turned to other sectors, in order to spatially separate the expected signal (from the target channel) from the interference signals (from other channels).

FIG. 1 is a perspective view of a directional antenna 100 used in the cell sectoring technique, and FIG. 2 shows its plan view. The directional antenna 100 has a rod-type radiator 103, a pair of reflector plates 102 arranged with an angle a between them in order to reflect the radio waves emitted from the radiator 103, and the rotating unit 101. The rotating unit 101 rotates the assembly of the radiator 103 and the reflector plates 102 about an axis parallel to the radiator rod, while maintaining the positional relationship between the radiator 103 and the reflector plates 102, to change the direction $\beta$ of the beam orientation. A reflector angle adjustor (or a reflector-plate opening/closing unit) 105 is provided behind the reflector plates 102. The reflector angle adjustor 105 changes the angle $\alpha$ between the two plates 102 to change the beam width (or the beam pattern) of the directional antenna 100.

FIG. 3A illustrates an antenna assembly using three directional antennas 100A, 100B, and 100C, which is used for a three-sector cell. The beam pattern of each directional antenna is directed to the associated sector, as illustrated in FIG. 3B.

FIG. 4A illustrates an antenna assembly using six directional antennas 100A through 100 F, which is used for a six-sector cell. The beam pattern of each directional antenna is directed to the associated sector, as illustrated in FIG. 4B.

The cell sectoring technique using these antenna assemblies is advantageous in the multi-path transmission environment with large transmission delay or spread in the direction of signal arrival, to reduce the interference from the other communication channels. However, in the multi-path transmission environment with little transmission delay or spread in the direction of arrival, the cell sectoring technique is not so advantageous. Especially, in the environment in which various radio signals having different communication qualities or transmission types (represented by the transmission power, the transmission rate, the error rate, etc.) exist, the cell sectoring techniques is inferior to the adaptive antenna array technique in its interference reducing ability.

The adaptive antenna array technique is another technique for reducing the interference from other channels. With this technique, multiple antenna elements are arranged in a predetermined configuration to form an antenna array in the base station. These antenna elements are controlled adaptively using known signals, such as a pilot bit or a unique word contained in the received signal, so as to maximize the signal to interference ratio (SIR). The interference can be spatially separated from the target signal.

FIG. 5 illustrates an example of the adaptive antenna array, and FIG. 6 illustrates the directivity of this adaptive antenna array. The adaptive antenna array 500 illustrated in FIG. 5 has n antenna elements ($501_1$, $501_2$, ..., $501_n$), and weighting means that multiply the signal received at each of the antenna elements by one of the associated weighting coefficients (w1, w2, ..., wn). The weighted signals are synthesized and a synthetic signal is output from the output terminal. Each of the weighting coefficients can be adjusted and varied so that the SIR of the synthetic signal becomes the maximum. This arrangement can achieve the optimum directivity.

In FIG. 6A, the directivity of the adaptive antenna array using four antenna elements (n=4) is illustrated. In this example, the antenna elements are rod-type radiator elements, which are aligned in a line to form an antenna array, as illustrated in FIG. 6B. In general, (n−1) null points are produced at the front face of the adaptive antenna array. In this example, three (4−1=3) null points are formed at the front face of the antenna array, as illustrated in FIG. 6A. These null points are directed to channels other than the target channel to achieve large interference reducing effect.

The adaptive antenna array technique is advantageous in reducing the interference, while increasing the traffic capacity, especially in the environment in which different qualities or different types of signals coexist at different transmission powers, different transmission rates, or different error rates. This is because the directivity characteristics of the antenna array, including the main lobe and the position of the null points, are appropriately changed so as to maximize the SIR. For example, by guiding a signal with large transmission power onto the null point, the communication quality of a low-transmission-power signal can be guaranteed.

However, in another multi-path transmission environment with wide spread of delay time or arrival directions in which transmission qualities or transmission types are similar to each other at similar transmission power levels, transmission rates, and error rates, the adaptive antenna array technique is inferior to the cell sectoring technique in ability to reduce interference. This is because, if there is a large spread of transmission delay or signal arrival direction, then the arrival direction of the target channel is dispersed. To respond to the dispersion of the arrival direction, the main lobe has to be formed wide. This causes the spatial separation of the target signal from the interference to be reduced. In addition, the interference reducing effect making use of the null points cannot be expected because the signal arrival directions of the other channels are also dispersed. Another reason for the reduction of the interference reducing effect is that the communication qualities or the transmission types of the signals are similar to each other, and therefore, it is difficult to find and bring a signal with large transmission power to a null point.

Using the above-described known techniques independently cannot respond to the change in the communication environment (including traffic conditions and communication qualities) in a flexible manner, and accordingly, it cannot optimize the traffic capacity in the given frequency band.

SUMMARY OF THE INVENTION

Therefore, it is an object of the present invention to optimize the traffic capacity of the cell or the sector, flexibly responding to the change in the communication environment.

To achieve the object, the configuration of the antenna array is automatically switched so as to be suitable for the cell sectoring technique or the adaptive antenna array technique, taking into account the transmission environment (including the signal arrival direction) and the transmission types existing in the service area. This arrangement can guarantee the optimum traffic capacity even if the transmission environment or variation in transmission qualities changes.

In one aspect of the invention, an antenna apparatus installed in a base station in a code division multiple access communication system is provided. The antenna apparatus comprises (a) a plurality of antenna elements, each receiving a radio signal, (b) a controller that produces an antenna control signal based on information contained in the radio signal received at each of the antenna elements, (c) an adjusting unit that adjusts directivity characteristics of each of the antenna elements based on the antenna control signal, and (d) an allocating unit that allocates each of the antenna elements to a sector based on the antenna control signal, the sector covering a portion of a cell controlled by the base station, and the number of sectors in the cell being variable by means of the antenna control signal.

This arrangement allows the directivity characteristics of the antenna element to be appropriately changed, while the number of sectors and allocation of the antenna elements are adjusted, in response to the change in the communication environment. Consequently, the traffic capacity can be optimized.

The antenna elements are arranged in an antenna array. The configuration of the antenna array can be changed by adjusting the directivity characteristics (such as the beam width and the main beam orientation) of each antenna element and the number of sectors, without changing the positions of the antenna elements in the array.

An example of an antenna array is a hexagonal array, in which the antenna elements are positioned along the sides of a hexagon. Alternatively, the antenna elements may be arranged in a hexagonal area. Furthermore, arbitrary polygonal antenna array may be used.

The controller determines transmission path conditions and variation in transmission type based on the radio signals received at the antenna elements, and produces the antenna control signal based on the determination results.

The transmission path conditions include transmission delay and the signal arrival direction in the multi-path environment. The transmission type includes transmission power, a transmission rate, an error rate, etc. Depending on the transmission path conditions and the variation in transmission type, the directivity of each antenna element and allocation of the antenna elements to sectors are adjusted by means of the antenna control signal.

In another aspect of the invention, a method for optimizing traffic capacity of a cell is provided. The cell is divided into a plurality of sectors. The method comprises the steps of:

(a) providing an antenna array to a base station that controls the cell, the antenna array being comprised of a plurality of antenna elements;
(b) receiving radio signals at the antenna elements;
(c) analyzing the radio signals;
(d) producing an antenna control signal based on the analysis result; and
(e) conducting at least one of adjusting directivity of each of the antenna elements and adjusting the number of sectors, while defining correspondence between the antenna elements and the sectors.

With this method, the directivity characteristics of the antenna element and the number of sectors can be adjusted in real time in response to a change in the communication environment.

BRIEF DESCRIPTION OF THE DRAWINGS

FIG. 8A illustrates an antenna array using eight directional antenna aligned in a line, and FIG. 8B illustrates the directivity of the antenna array of FIG. 8A;

DETAILED DESCRIPTION OF THE INVENTION

Figure 7A:
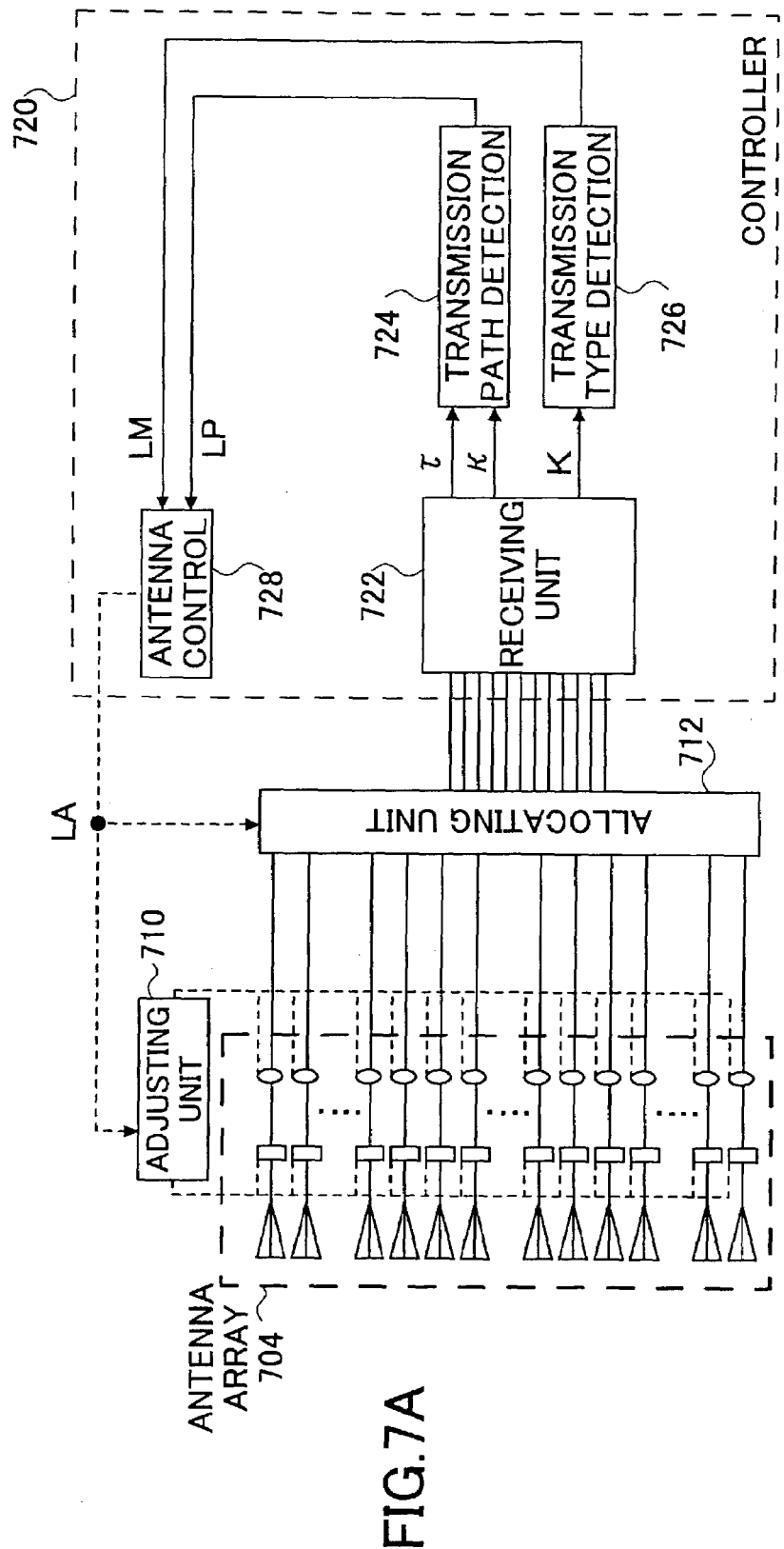
FIG. 7A illustrates an antenna apparatus according to an embodiment of the invention.
Figure 7B:
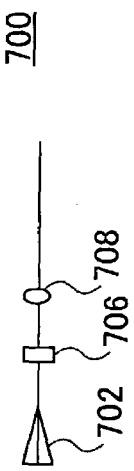
FIG. 7B illustrates an antenna element used in the antenna array shown in FIG. 7A.

FIG. 7 is a schematic block diagram illustrating an antenna apparatus 700 according to an embodiment of the invention. The antenna apparatus 700 has an antenna array 704 comprised of a predetermined number of antenna elements 702. In this example, the antenna array includes eighteen (18) antenna elements 702. Each antenna element 702 is furnished with a reflector plate angle adjustor 706 for adjusting the beam width of the antenna element 702 and an antenna axis rotating unit 708 for adjusting the direction of the beam pattern of the antenna element 702. The reflector plate angle adjustor 706 adjusts the angle between the two reflector plates by opening or closing the two plates. The reflector plate angle adjustor 706 and the antenna axis rotating unit 708 are connected to an adjusting unit 710. Based on the instructions supplied from the adjusting unit 710, the beam width and the direction of the radiation pattern can be adjusted independently for each antenna element 702.

Each of the antenna elements 702 is connected to the controller 720 via the allocating unit 712 that defines the correspondence between the antenna elements 702 and the sectors in the cell. The controller 720 has a receiving unit 722 that receives, via the allocating unit 712, the signals from the respective antenna elements 702. The receiving unit 722 calculates weighting coefficients for the adaptive antenna array and multiples each receiving signal by the associated weighting coefficient. The receiving unit 722 comprises a multi-user receiver capable of receiving signals associated with multiple codes (i.e., multiple users), and it can demodulate data for multiple users.

The controller 720 also has a transmission path detection unit 724 and a transmission type detection unit 726. The transmission path detection unit 724 receives predetermined parameters ($\tau$, $\kappa$) from the receiving unit 722, which are extracted from the received signal by the receiving unit 722 during demodulation. The transmission type detection unit 726 receives another parameter (K) from the receiving unit 722, which is also extracted by the receiving unit 722 during demodulation. The output (LP) of the transmission path detection unit 724 and the output (LM) of the transmission type detection unit 726 are connected to the inputs to the antenna control unit 728, which is also included in the controller 720. The output of the antenna control unit 728, that is, the antenna control signal, is supplied to the adjusting unit 710 and to the allocating unit 712.

Figure 1:
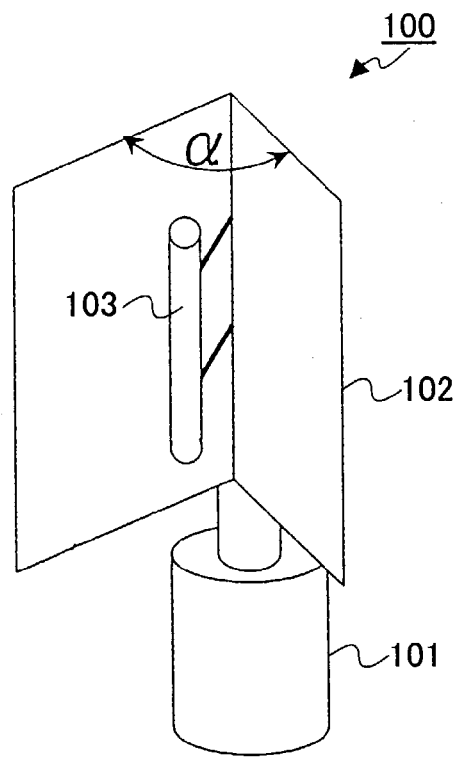
FIG. 1 is a perspective view of an antenna used in the cell sectoring technique.
Figure 2:
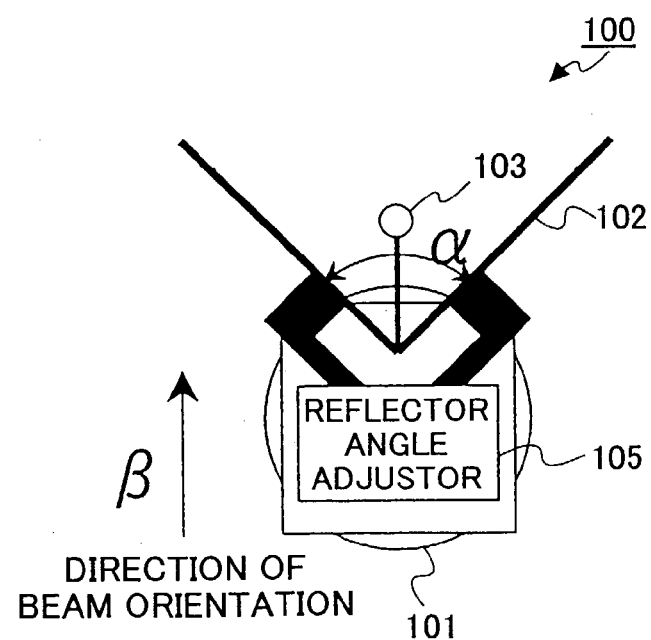
FIG. 2 is a plan view of the antenna shown in FIG. 1.
Figure 3A:
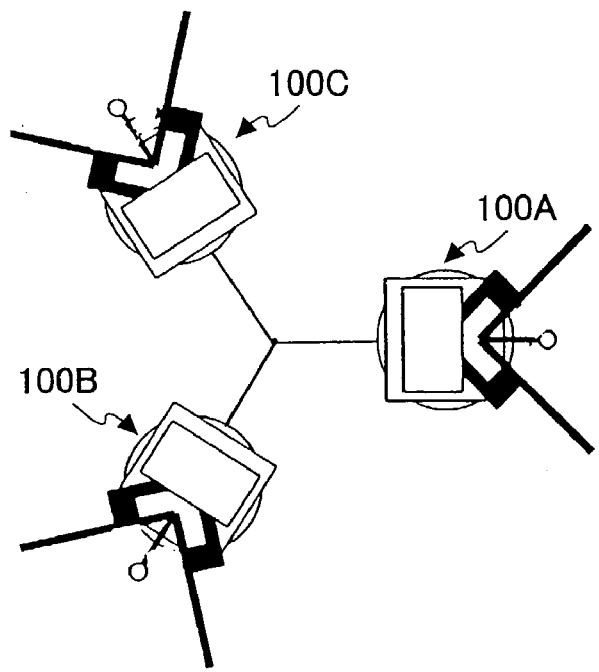
FIG. 3A illustrates an antenna assembly using three directional antennas allocated to the associated sectors of a cell.
Figure 3B:
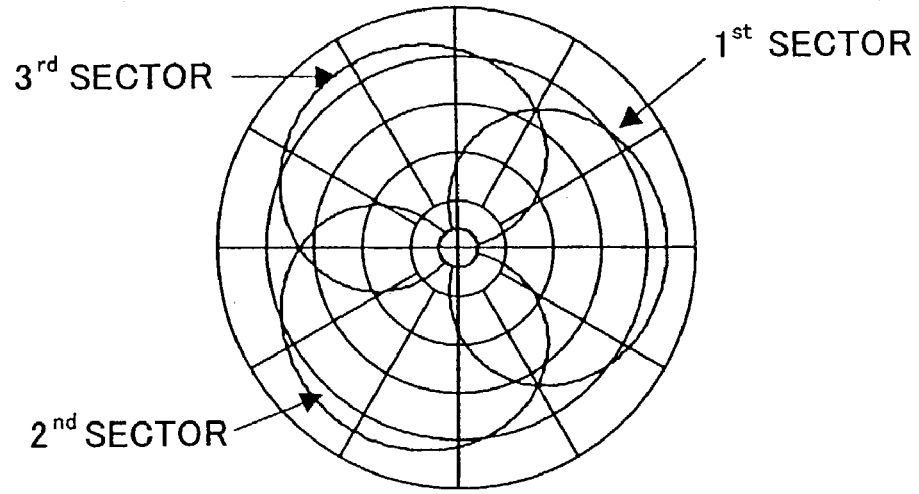
FIG. 3B illustrates the directivity of the antenna assembly of FIG. 3A.
Figure 4A:
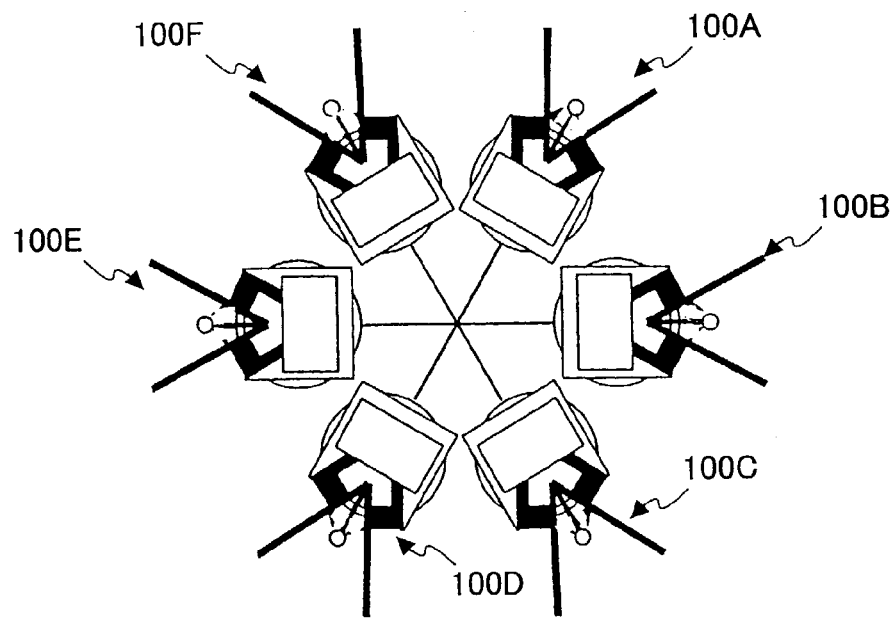
FIG. 4A illustrates an antenna assembly using six directional antennas allocated to the associated sectors in a cell.
Figure 4B:
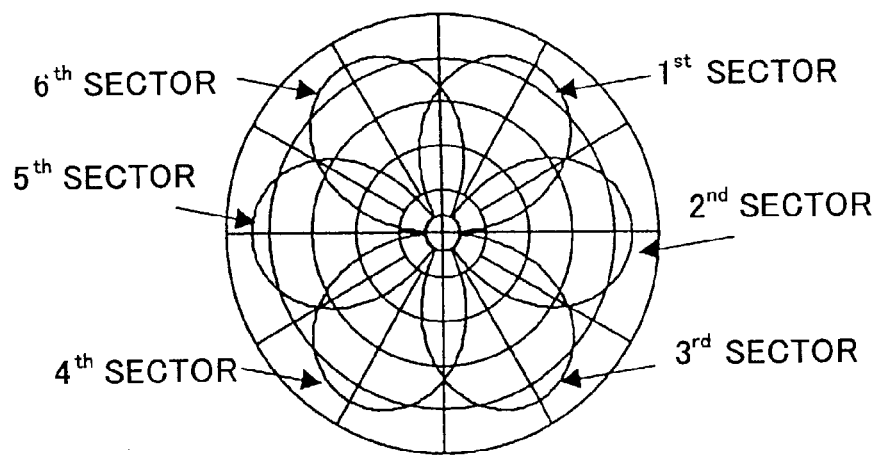
FIG. 4B illustrates the directivity of the antenna assembly of FIG. 4A.
Figure 5:
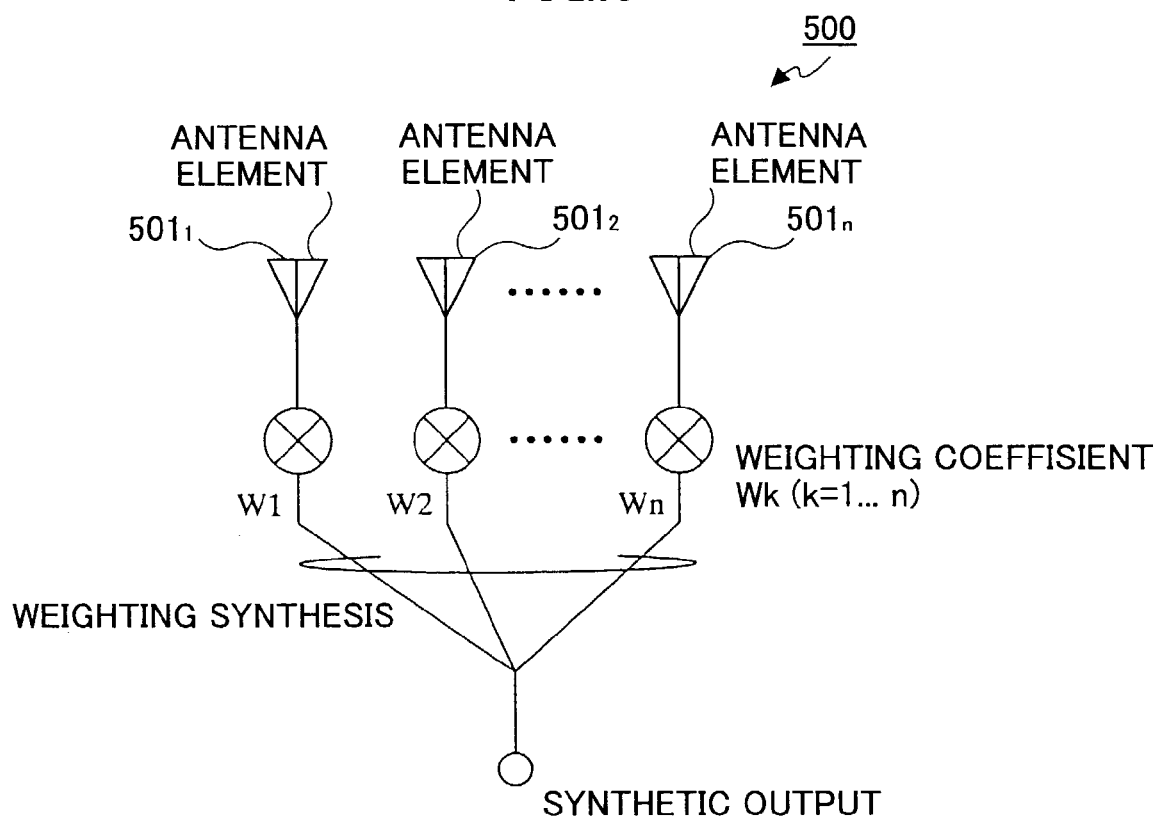
FIG. 5 schematically illustrates an adaptive antenna array used in an adaptive antenna array technique.
Figure 6A:
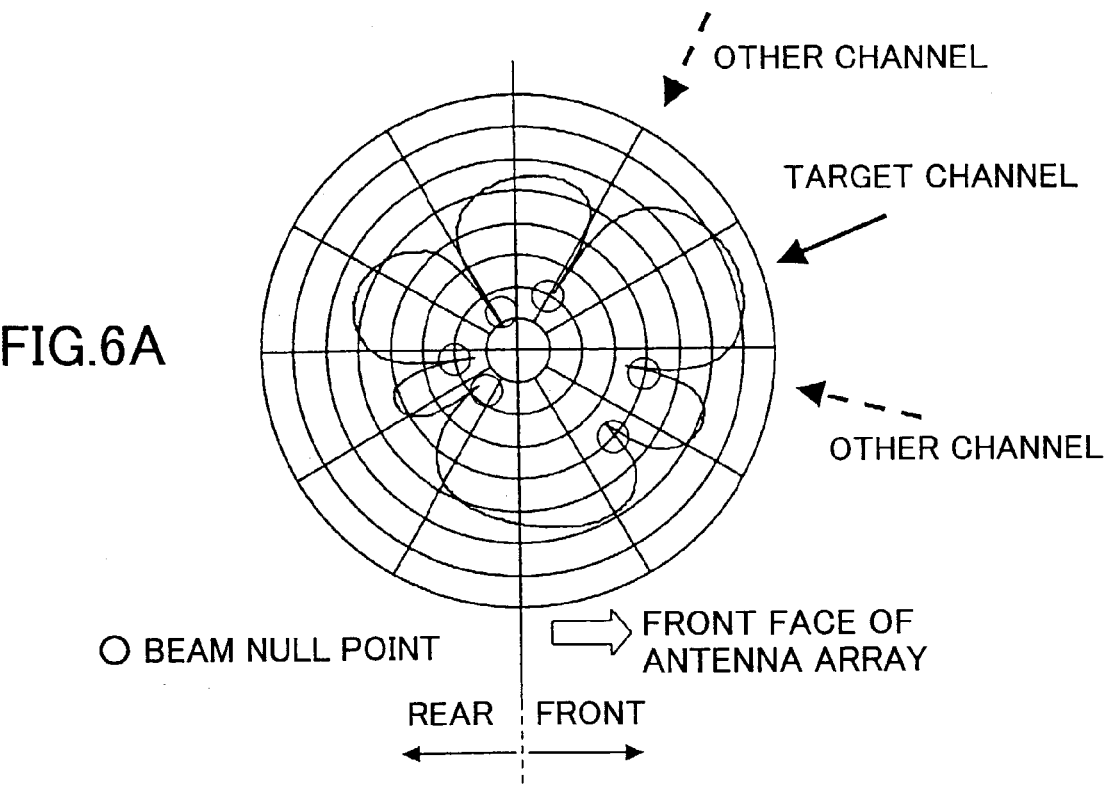
FIG. 6A illustrates the directivity of the adaptive antenna array shown in FIG. 5.
Figure 6B:
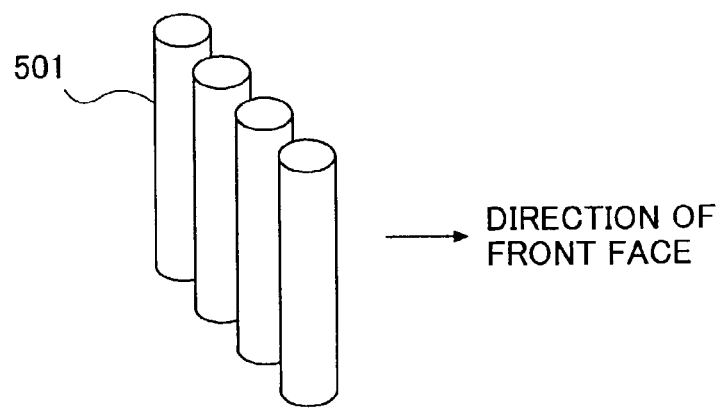
FIG. 6B illustrates an example of the configuration of the antenna elements.

The antenna apparatus 700 employs a combination of the cell sectoring technique and the adaptive antenna array technique. To be more precise, directional antenna elements (shown in FIG. 1) used in the cell sectoring techniques are arranged in the array 704 to implement the adaptive antenna array technique. The directivity of the antenna array 704 is determined by various factors, such as the directivity of each antenna element 702, the number of antenna elements 702, the configuration of the antenna elements 702, weighting factors for the respective antenna elements 702, and so on. The controller 720 flexibly determines which technique to be used is dominant.

FIG. 8A illustrates an example of an antenna configuration in which eight directional antennas (beam antennas) are aligned in a line, and FIG. 8B illustrates the antenna pattern (or the directivity characteristic) of this antenna array. As illustrated in FIG. 8B, the antenna array exhibits a large directivity toward the front face of the antenna array, together with some side lobes and null points. The beam patterns (or the antenna patterns) are converged in a sector, which means that the antenna array can be assigned to this sector. In the example shown in FIG. 8B, the beam patterns are distributed over about 60 degrees with a peak (or the main lobe) toward a specific direction. Accordingly, by preparing six antenna arrays, all directions over the entire cell can be covered.

Figure 9:
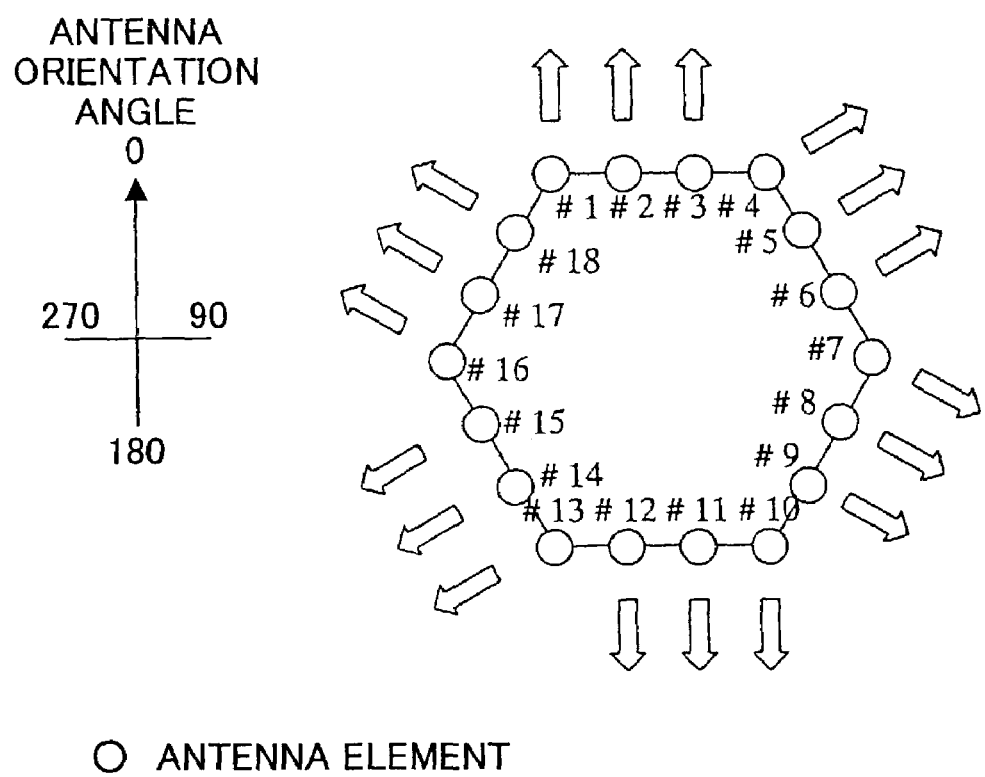
FIG. 9 illustrates an example of a six-sector antenna array, in which the antenna elements are arranged along the sides of a hexagon so as to face six directions.

FIG. 9 illustrates a 6-sector antenna array, in which antenna elements are arranged along each side of a hexagonal array. The number of sectors (S) is six, and the number of antenna elements (A) per sector is three. The total number of antenna elements is eighteen (6*3=18). The first through third antenna elements are directed at an orientation angle of zero degree. The fourth through sixth antenna elements are directed at an angle of 60 degrees. The seventh through ninth antenna elements are directed at 120 degrees. The tenth through twelfth antenna elements are directed at 180 degrees, the thirteenth through fifteenth antenna elements are at 240 degrees, and the sixteenth through eighteenth antenna elements are at 300 degrees.

Figure 10:
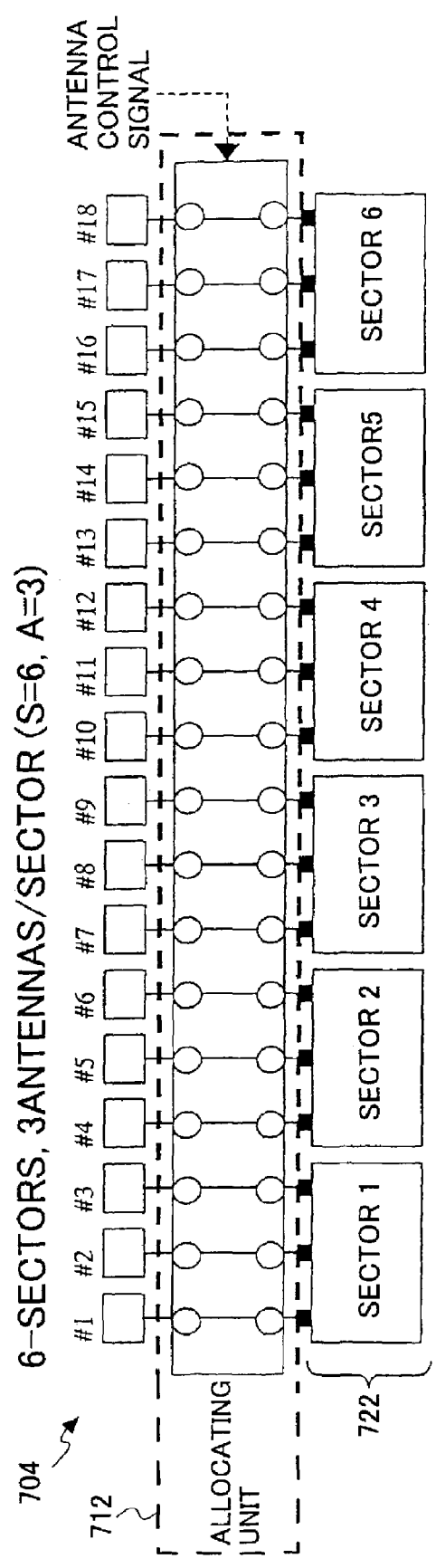
FIG. 10 illustrates the antenna allocating unit shown in FIG. 7 that allocates the antenna elements into six sectors.

FIG. 10 illustrates the detailed structure of the allocating unit 712 inserted between the antenna array 704 and the receiving unit 722 (see FIG. 7). This arrangement corresponds to the configuration of the six-sector antenna array shown in FIG. 9. The allocating unit 712 defines the correspondence between the respective antenna elements (#1 through #18) and the sectors, based on the antenna control signal supplied from the antenna control unit 728 (see FIG. 7). The antenna elements #1 through #3 arranged at an orientation angle of zero degrees are allocated for Sector 1. The antenna elements #4 through #6 arranged at an angle of 60 degrees are allocated for Sector 2. The antenna elements #7 through #9 at an angle of 120 degrees are allocated for Sector 3. Similarly, those antenna elements at angles 180 degrees, 240 degrees, and 300 degrees are allocated to the associated Sectors 4, 5, and 6. The allocation of antenna elements can be appropriately varied depending on the conditions of the transmission path. It should be noted that the six blocks illustrated below the allocating unit 712 in FIG. 10 simply conceptualize the process of the receiving unit 722 for Sectors 1 through 6.

In operation, communication signals of the respective antenna elements or the respective sectors are supplied to the receiving unit 722 of the antenna apparatus 700 shown in FIG. 7. The receiving unit 722 extracts predetermined parameters, such as delay parameter $\tau$ representing path delay time, and direction (or angle) parameter $\kappa$ representing an arrival direction, from the signals. The extracted parameters $\tau$ and $\kappa$ are supplied to the transmission path detection unit 724. The transmission path detection unit 724 may take the signal intensity into account, in addition to the delay parameter and the direction parameter, as necessary.

The transmission path detection unit 724 checks the conditions of the transmission path, based on the parameters supplied from the receiving unit 722, and outputs transmission path level LP. One of the purposes of checking the conditions of the transmission path is to determine the influence of the multi-path transmission environment. As long as this purpose can be achieved, the transmission path detection unit 724 may have an arbitrary structure.

Since the receiving unit 722 comprises a multi-user receiver, a statistical process can be carried out using the parameters about multiple users extracted from the received signals. For example, if the delay parameter $\tau$ is represented as a delay profile $P(\tau)$ for each mobile terminal, then a delay spread ($\sigma_\tau$) can be calculated from the obtained delay profiles of multiple users. Cumulative distribution X %, which corresponds to the deviation along the time axis, can be derived from the statistical information (i.e., the delay spread). Similarly, if the direction parameter $\kappa$ is represented as an angle profile $P(\kappa)$ for each mobile terminal, then an angle spread ($\sigma_\kappa$) can be calculated from the obtained angle profiles of multiple users. Cumulative distribution Y % of the angle spread, which corresponds to the deviation in the direction of signal arrival, can be derived from the angle spread.

In one example, the transmission path level LP is determined from the cumulative distribution X % of delay spread (i.e., deviation along the time axis) and the cumulative distribution Y % of angle spread (i.e., variation in the arrival direction), with reference to a table generated in advance by simulation or experience. Alternatively, the transmission path level LP may be calculated each time the signal is received.

On the other hand, the receiving unit 722 extracts parameter K representing the communication quality or the channel type from a communication signal. The extracted parameter is supplied to the transmission type detection unit 726. The transmission type detection unit 726 checks the quality or the type of the transmission channel of the received signal, based on the parameter supplied from the receiving unit 722. Then, the transmission type detection unit 726 outputs the transmission type level LM.

The transmission type can be determined from the transmission power, the transmission rate, or the error rate. The transmission type detection unit 726 may have any structure as long as the detection of the transmission type (or the channel type) can be implemented. If the parameter K represents the electric power of the signal transmitted from a mobile terminal and received at the base station, the power level is related to the type of the communication channel or the type of the mobile terminal. Through the statistical process, distribution and variation in the power levels of the received signals can be obtained. In general, such deviation is large in CDMA as compared with other radio communication systems.

Antenna control unit 728 receives the output LP from the transmission path detection unit 724 and the output LM from the transmission type detection unit 726. Then, it generates and outputs an antenna control signal LA based on the LP signal and the LM signal. Transmission path detection level LP is an index representing the characteristics of the multi-path transmission environment, and transmission type detection level LM is the index representing the variation in type of transmission.

If the transmission path level LP is large, there are large variations in arrival direction and delay time of the received signals, and therefore, influence of the multi-path environment is strong. In this case, the antenna control unit 728 outputs the antenna control signal LA that gives priority to the cell sectoring control making use of a moderate antenna pattern. In this situation, if the transmission type detection level LM is low, the distribution of the transmission types or qualities is small, which means that not so many types of mobile terminals are currently used in the service area. In this case, the cell sectoring technique is further recommended.

On the other hand, if the transmission path level LP is small, variation in the arrival direction or the delay time of the transmission signal is small, and influence of the multi-path environment is small. In this case, it is preferable to adaptively change the antenna pattern to increase the SIR, and therefore, the adaptive antenna array technique is employed to be dominant. In addition, if the transmission type level LM is large, the quality or the type of the transmission signals (or the mobile terminals) varies to a great extent. In this case, the adaptive antenna array technique is further recommended.

Cell sectoring and adaptive antenna array techniques are controlled by adjusting the directivity of the relevant antenna elements 702 of the antenna array 704 by means of the adjusting unit 710. To what extent each antenna element is adjusted may be determined using a lookup table produced in advance based on a simulation or experience as to the transmission path level LP and the transmission type level LM. Alternatively, it may be calculated each time the antenna control signal LA is supplied.

With the antenna apparatus 700, the configuration of the antenna array 704 can be changed without changing the positions of the antenna elements 702, using at least one of the allocating unit 712 and the adjusting unit 710. The beam width and the direction of beam orientation can be changed using the reflector plate angle adjusting unit 706 and the antenna axis rotating unit 708, based on the antenna control signal LA. By adjusting the beam width and the beam orientation of each antenna element 702, cell sectoring control and adaptive antenna array control can be switched in an adjustable manner.

In addition, the number of sectors can be changed by means of the allocating unit 712 based on the antenna control signal LA. If the transmission path level LP is low under less influence of the multi-path transmission environment, and if the transmission type level LM is low with less variation in transmission type or quality, then, the number of sectors is reduced. In this case, more antenna elements 702 are allocated to a sector with adaptive antenna array control being dominant. In general, as the number of antenna elements 702 per sector increases, the main lobe in the directivity characteristics becomes sharp and the gain increases. This results in less transmission power being required to carry out radio communication. Since the quantity of radiation decreases, interference to the adjacent sectors or the adjacent cells can be reduced. Consequently, the traffic capacity of the entire system increases.

Figure 11:
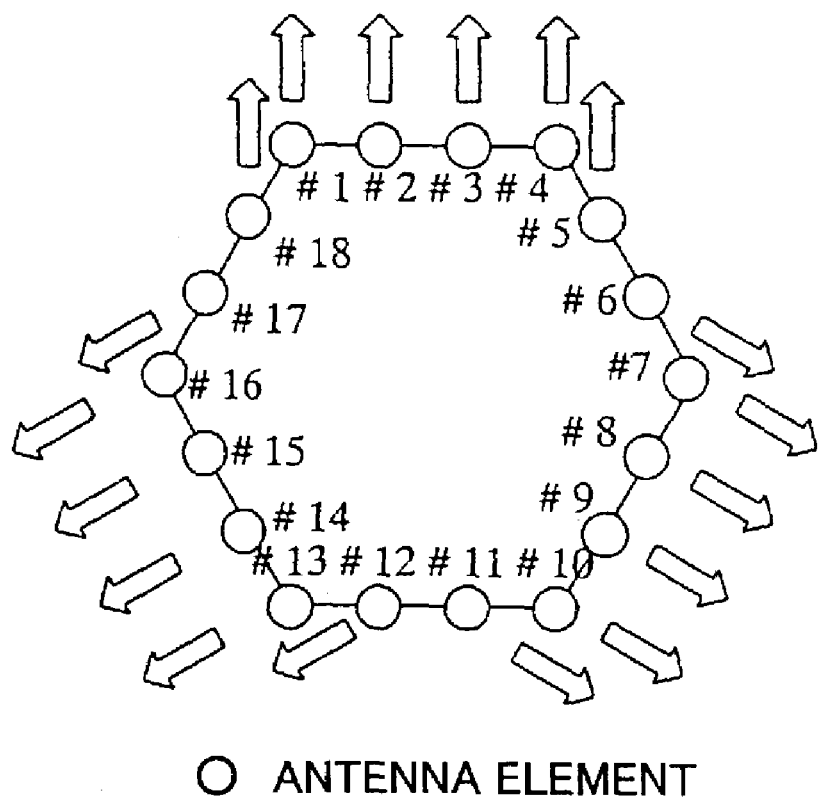
FIG. 11 illustrates an example of three-sector antenna array, in which the antenna elements are arranged along the sides of a hexagon so as to face three directions.

FIG. 11 illustrates a three-sector antenna array, which can be configured by the adjusting unit 710 and the allocating unit 712 based on the antenna control signal LA. The number of sectors (S) is three, and the number of antenna elements (A) per sector is six. The total number of antenna elements is eighteen (6*3=18), which is the same as that shown in FIG. 9. The positions of these antenna elements are also the same as those in FIG. 9, but with different directivity. To be more precise, the first through fifth antenna elements and the eighteenth antenna elements (#1–#5 and #18) are arranged at an orientation angle of zero degrees. The sixth through eleventh antenna elements (#6–#11) are arranged at 120 degrees. The rest of the antenna elements (#12–#17) are arranged at 240 degrees.

Figure 12:
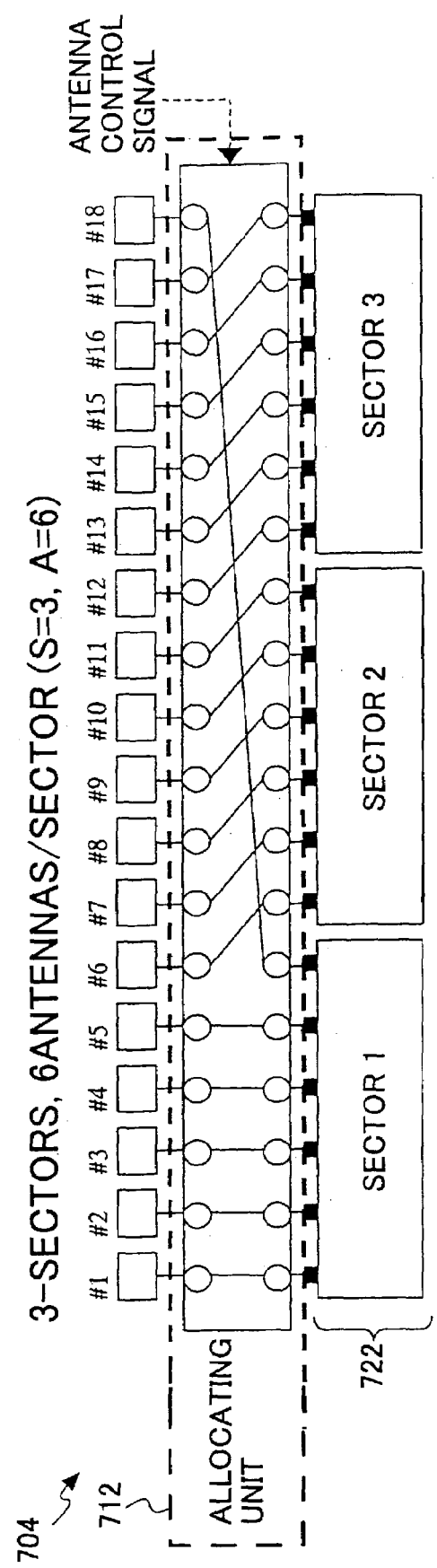
FIG. 12 illustrates the antenna allocating unit shown in FIG. 7 that allocates the antenna elements into three sectors.

FIG. 12 illustrates the allocating unit 712 that realizes the configuration of the three-sector antenna array shown in FIG. 11. With this example, the orientation angle of zero degrees corresponds to Sector 1, the angle of 120 degrees corresponds to Sector 2, and the angle of 240 degrees corresponds to Sector 3. By adjusting the allocation of the antenna elements, the number of sectors can be changed. The blocks of Sector 1 through Sector 3 simply conceptually illustrate the process for the sectors carried out in the receiving unit 722.

Of course, the number of sectors can be increased. If the transmission path level LP is high with large influence of the multi-path transmission environment, and if the transmission type level LM is also high with variety of transmission qualities (i.e., with variety of mobile terminals), then the number of sectors is increased in order to respond to more users, while conducting adaptive antenna array control. The interference may be reduced by increasing the number of sectors depending on the situation.

In this manner, the transmission environment and the variation in transmission type are detected during the operation of the antenna apparatus, and the antenna configuration is changed in real time based on the detection result. By appropriately changing the number of sectors and the number of antenna elements in a sector, while adjusting the beam width and orientation, cell sectoring control and adaptive antenna array control can be appropriately switched.

Preferably, the antenna control unit 728 stores a predetermined set of setting values corresponding to all the possible values of transmission path level LP and the transmission type level LM. The setting values are used to control the antenna array 704, including the configuration and the number of sectors. The setting values are written in a lookup table generated in advance based on simulation or experience concerning the transmission path level LP and the transmission type level LM. Alternatively, an antenna array control value may be calculated each time the transmission path level LP and the transmission type level LM are input.

The antenna control unit 728 outputs an antenna control signal LA having a value suitably selected for the specific transmission path level LP and the transmission type level LM. The output signal LA is supplied to the adjusting unit 710 and the allocation unit 712, which carry out necessary processes, for example, adjusting the beam width, the beam orientation, the tilt angle, the number of sectors, etc.

In the above-described embodiment, mechanical means are employed to change the beam width and the beam orientation of the antenna element 702. This arrangement is advantageous from the standpoint of achieving a high gain with a simple structure. However, other arrangements may be employed as long as the beam width and the beam orientation can be appropriately varied in response to the antenna control signal. For example, the directivity of a specific type of antenna element can be changed electrically by adjusting the phase of the electric supply to the antenna element. This arrangement is preferable from the viewpoint of reducing the number of mechanically moving components of the antenna apparatus as much as possible.

In the embodiment, the antenna array 704 is comprised of directional antenna elements, each of which has directivity suitable for the associated sector. However, an omni antenna (i.e., an omni-directional antenna) may be used. The shape and configuration of the antenna array is not limited to the embodiment, although a hexagonal array is preferable because the number of sectors is generally three or six. With the antenna elements arranged along the respective sides of a polygonal array, the number of sectors (S) or the number of antenna elements (A) per sector can be varied by changing the beam width and the beam orientation without changing the positions of the antenna elements.

The antenna apparatus of the present invention can adjust not only the directivity characteristics of the antenna elements, but also the number of sectors in the cell. Accordingly, the antenna apparatus can optimize the traffic capacity of each sector or the cell in prompt response to an environmental change.

This patent application is based on and claims the benefit of the earlier filing date of Japanese patent application No. 2002-037296 filed Feb. 14, 2002, the entire contents of which are hereby incorporated by reference.

What is claimed is:

1. An antenna apparatus installed in a base station in a code division multiple access communication system, the apparatus comprising:
    a plurality of antenna elements, each configured to receive at least one radio signal;
    a controller configured to produce an antenna control signal based on at least a path delay time and an arrival direction, both the path delay time and the arrival direction are extracted from the at least one radio signal received at each of the antenna elements;
    an adjusting unit configured to adjust a directivity characteristic of each of the antenna elements based on the antenna control signal; and
    an allocating unit configured to allocate each of the antenna elements to one of sectors based on the antenna control signal, the sector covering a portion of a cell controlled by the base station, and the number of sectors in the cell being variable by means of the antenna control signal, the allocating unit being configured to control the number of sectors based on a combination of cell sectoring and adaptive array control.

2. The antenna apparatus according to claim 1, wherein the controller extracts prescribed parameters from the at least one radio signal received at each of the antenna elements to produce the antenna control signal.

3. The antenna apparatus according to claim 2, wherein the controller determines a transmission path condition and a variation in transmission type, based on the extracted parameters.

4. The antenna apparatus according to claim 1, wherein the controller determines a transmission path condition and a variation in transmission type, based on the at least one radio signal received at the antenna elements.

5. The antenna apparatus according to claim 3 or 4, wherein the controller produces the antenna control signal based on the transmission path condition and the variation in transmission type.

6. The antenna apparatus according to claim 1, wherein the antenna elements are arranged in an antenna array having a polygonal area.

7. The antenna apparatus according to claim 1, wherein the antenna elements are arranged along the sides of a polygon.

8. The antenna apparatus according to claim 6 or 7, wherein the controller varies at least one of the directivity characteristic of each of the antenna elements and the number of sectors in the cell through at least one of the adjusting unit and the allocating unit.

9. The antenna apparatus according to claim 6 or 7, wherein the controller changes a configuration of the antenna array without changing positions of the antenna elements on the antenna array.

10. The antenna apparatus according to claim 1, wherein the controller is further configured to establish a delay profile and an angle based on the path delay time and the arrival direction, and configured to analyze the delay profile and the angle profile statistically to produce the antenna control signal.

11. The antenna apparatus according to claim 10, wherein the statistical analysis of the delay profile and the angle profile takes a cumulative distribution of the delay profile and the angle profile over the time into account.

12. The antenna apparatus according to claim 10, wherein the statistical analysis of the delay profile and the angle profile calculates a delay spread and an angle spread of multiple users.

13. A method for optimizing traffic capacity of a cell, the cell being divided into a plurality of sectors, the method comprising:

providing an antenna array to a base station that controls the cell, the antenna array including a plurality of antenna elements;

receiving radio signals at the antenna elements;

extracting at least path delay times and arrival directions from the radio signals;

analyzing the radio signals including path delay times and arrival directions;

determining an optimal array configuration and flexibly selecting both cell sectoring and adaptive array techniques to arrange the antenna array;

producing an antenna control signal based on the analysis result;

adjusting a directivity characteristic of each of the antenna elements; and adjusting a number of sectors, while defining a correspondence between the antenna elements and the plurality of sectors.

14. The method according to claim 13, wherein the analyzing includes determination of a transmission path condition and determination of a variation in transmission type, and producing the antenna control signal based on the determination results of the transmission path condition and the variation in transmission type.

15. The method according to claim 13 or 14, wherein the analyzing includes extraction of prescribed parameters from the radio signals.

16. The method for optimizing traffic capacity according to claim 13, wherein the analyzing further includes establishing a delay profile and an angle profile based on path delay times and arrival directions, and analyzing the delay profile and the angle profile statistically.

17. The method for optimizing traffic capacity according to claim 16, wherein the analyzing statistically of the delay profile and the angle profile takes a cumulative distribution of the delay profile and the angle profile over the time into account.

18. The method for optimizing traffic capacity according to claim 16, wherein the analyzing statistically of the delay profile and the angle profile calculates a delay spread and an angle spread of multiple users.

* * * * *